United States Patent
Takezawa et al.

(10) Patent No.: US 8,550,497 B2
(45) Date of Patent: Oct. 8, 2013

(54) STEERING DEVICE

(75) Inventors: Naoyuki Takezawa, Gunma-ken (JP); Yoshiyuki Sato, Gunma-ken (JP); Toru Ito, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 255 days.

(21) Appl. No.: 13/009,543

(22) Filed: Jan. 19, 2011

(65) Prior Publication Data

US 2011/0175335 A1    Jul. 21, 2011

(30) Foreign Application Priority Data

Jan. 20, 2010  (JP) .................................. 2010-010015
Nov. 18, 2010  (JP) .................................. 2010-258406

(51) Int. Cl.
*B62D 1/18*       (2006.01)

(52) U.S. Cl.
USPC .......................................... 280/775; 74/493

(58) Field of Classification Search
USPC .......................................... 280/775; 74/493
See application file for complete search history.

(56) References Cited

U.S. PATENT DOCUMENTS

| | | | |
|---|---|---|---|
| 5,743,150 A * | 4/1998 | Fevre et al. ..................... 74/493 |
| 6,467,807 B2 * | 10/2002 | Ikeda et al. .................... 280/775 |
| 7,325,833 B2 * | 2/2008 | Sawada et al. ................. 280/775 |
| 7,353,727 B2 * | 4/2008 | Murakami et al. .............. 74/493 |
| 7,354,069 B2 * | 4/2008 | Yamada ......................... 280/775 |
| 7,516,682 B2 * | 4/2009 | Schneider et al. ............... 74/493 |
| 7,607,694 B2 * | 10/2009 | Shinohara et al. ............. 280/775 |
| 7,726,691 B2 * | 6/2010 | Yamada ......................... 280/775 |
| 7,954,852 B2 * | 6/2011 | Ueno et al. ..................... 280/775 |
| 8,256,322 B2 * | 9/2012 | Takezawa et al. ............... 74/493 |
| 2005/0104353 A1 * | 5/2005 | Ikeda et al. .................... 280/775 |
| 2005/0225068 A1 * | 10/2005 | Ishida et al. ................... 280/775 |
| 2009/0044657 A1 * | 2/2009 | Osawa et al. ................... 74/493 |
| 2010/0088501 A1 * | 4/2010 | Bramley, Jr. ....................... 713/2 |
| 2011/0203403 A1 * | 8/2011 | Maniwa et al. ................. 74/493 |
| 2012/0198956 A1 * | 8/2012 | Takezawa et al. ............... 74/493 |

FOREIGN PATENT DOCUMENTS

| | | |
|---|---|---|
| JP | 2006-240327 A | 9/2006 |
| JP | 2009-143299 A | 7/2009 |

OTHER PUBLICATIONS

Kenji Imamura, Vehicular Steering Device, Jul. 2, 2009, JPO, JP 2009-143299 A, Machine Translation of Description.*
Cho et al., Position Adjustment Device of Steering Handle, Jul. 2, 2009, JPO, JP 2009-143299 A, Machine Translation of Description.*

* cited by examiner

*Primary Examiner* — Ruth Ilan
*Assistant Examiner* — James English
(74) *Attorney, Agent, or Firm* — McGinn IP Law Group, PLLC

(57) ABSTRACT

Provided is a steering device in which play of a bolt shaft and the like during telescopic adjustment can be prevented using a telescopic adjustment function enabling a driver to adjust a position of a steering wheel in a front-rear direction. The steering device includes a column pipe, an outer housing, a fixed bracket, a stopper bracket, a tightening member having a bolt shaft, a slide guide, an elastic stopper rubber material mounted on the slide guide, and an elastic pushing member in which torsional coil spring portions are formed at both axial ends of a pushing shaft portion. The bolt shaft is passed through a tightening hole of the outer housing and a support hole of the fixed bracket along shaft support portions of the slide guide, and the elastic pushing member is locked and fixed to the fixed bracket.

10 Claims, 13 Drawing Sheets

FRONT-REAR DIRECTION

REAR    FRONT

FRONT-REAR DIRECTION

REAR    FRONT

REAR    FRONT

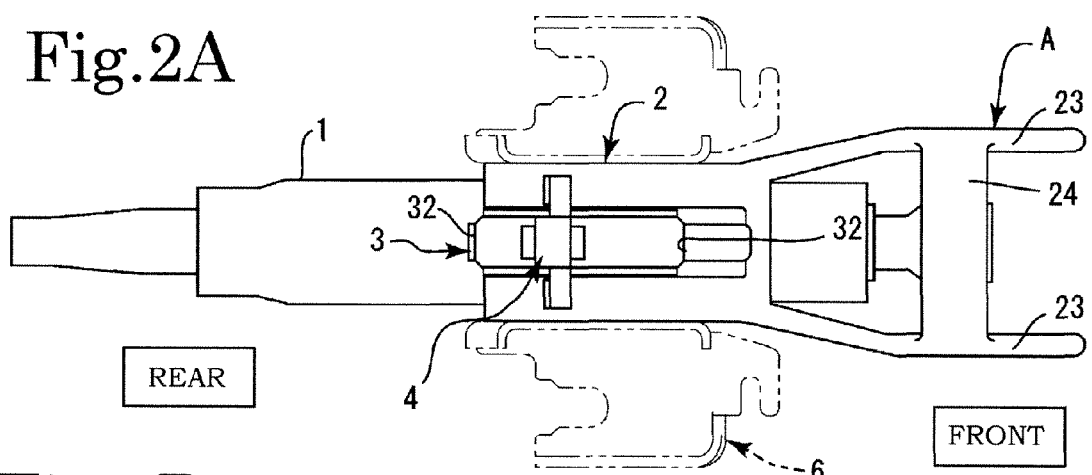
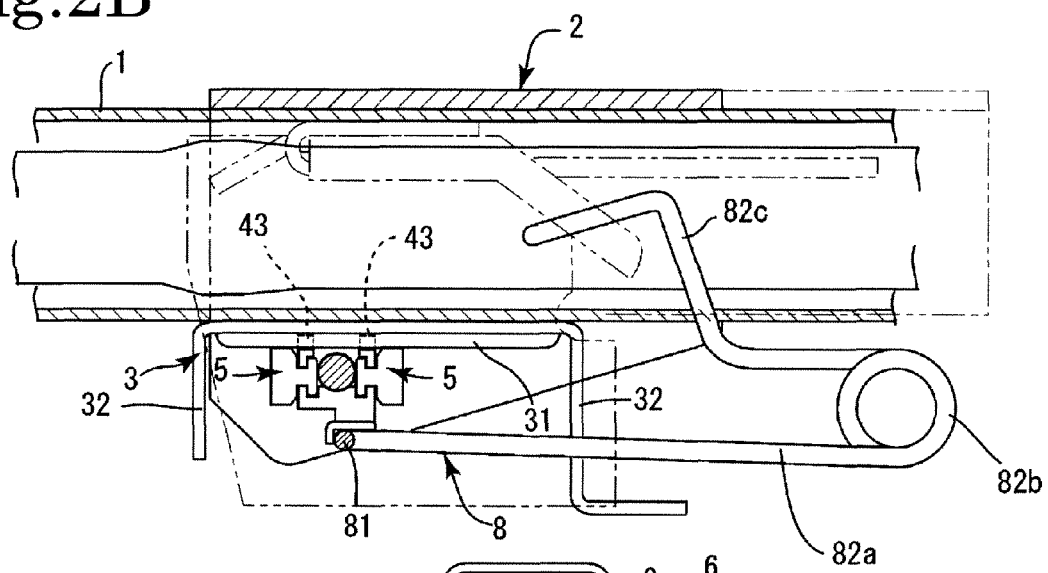
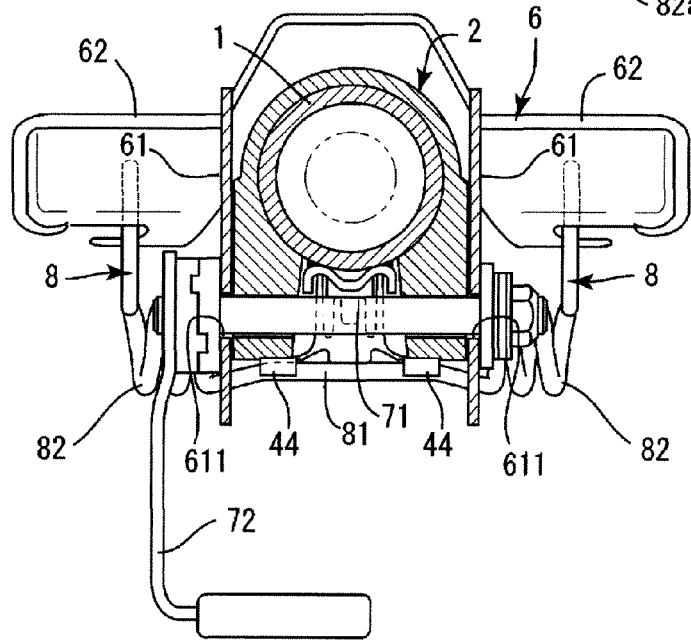

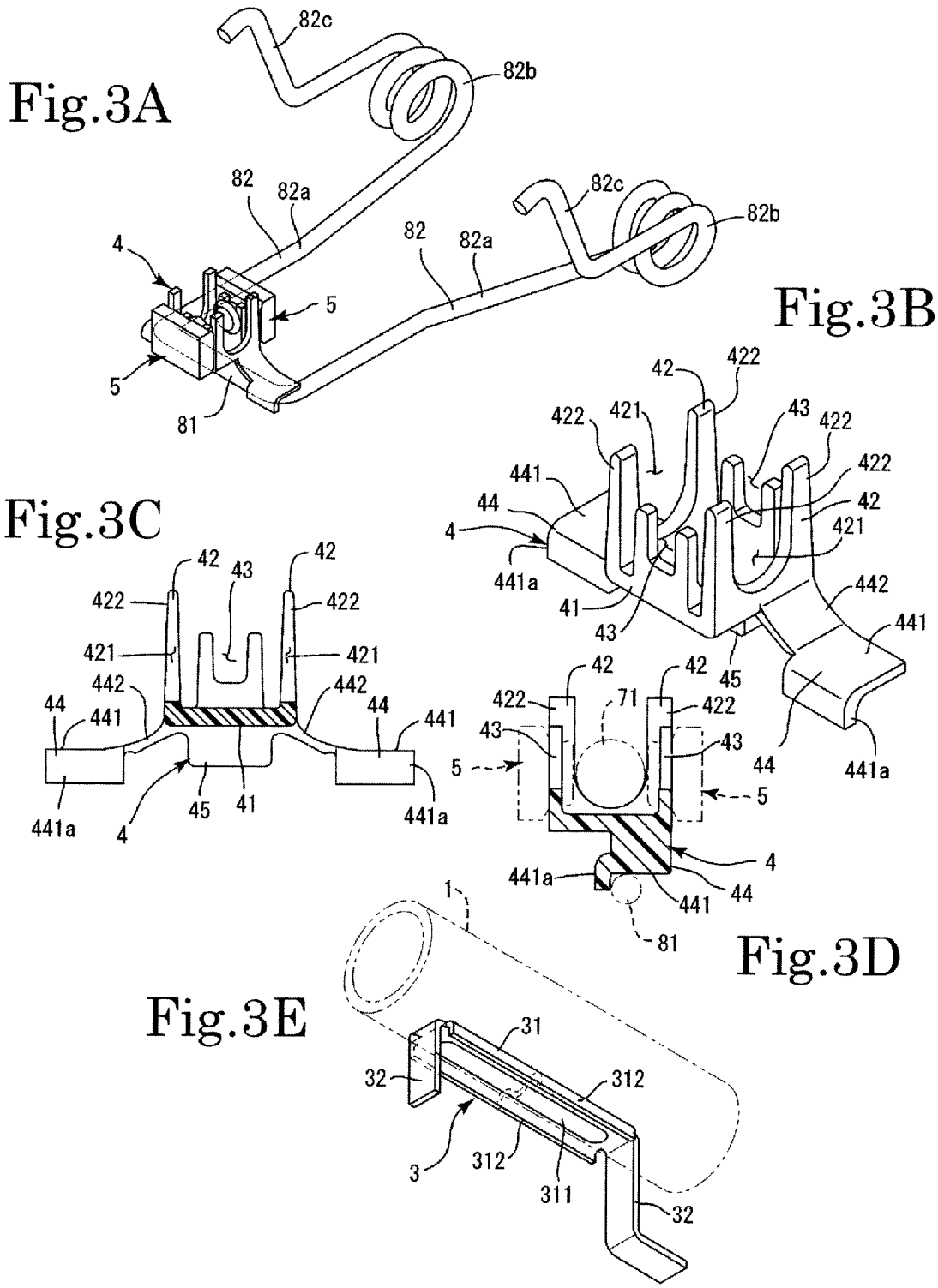

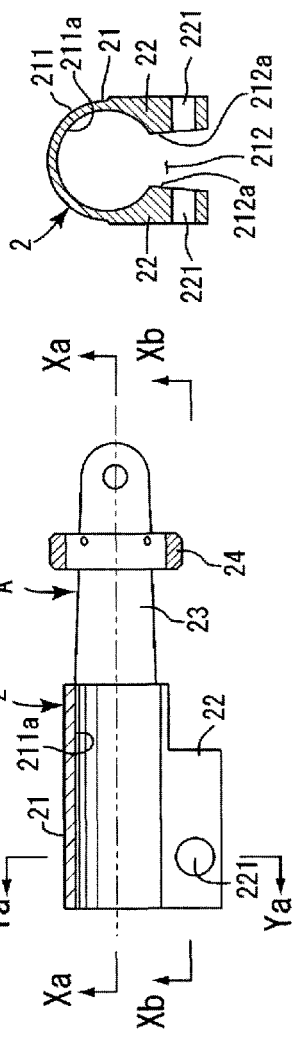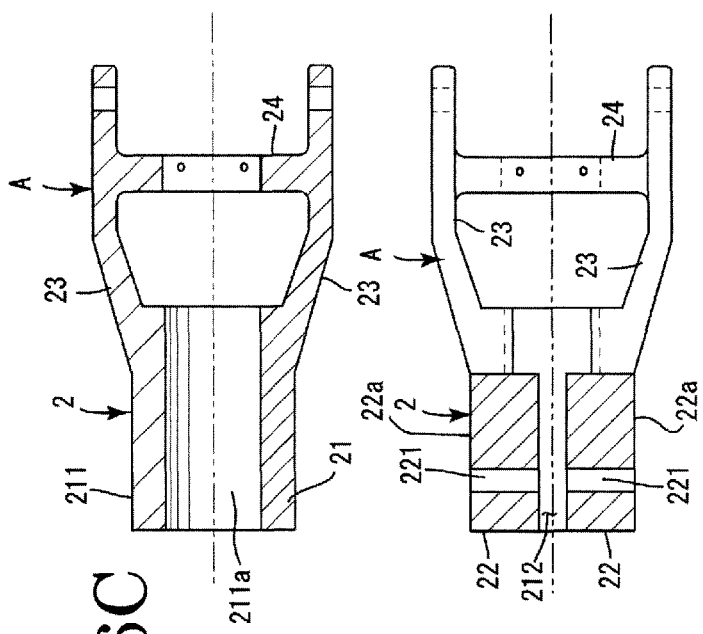

STEERING DEVICE

BACKGROUND OF THE INVENTION

1. Field of the Invention

The present invention relates to a steering device in which play of a bolt shaft and the like during telescopic adjustment can be prevented using a telescopic adjustment function enabling a driver to adjust a position of a steering wheel in a front-rear direction.

2. Description of the Related Art

A variety of steering devices equipped with a telescopic adjustment mechanism are known. A typical structure of such a steering device includes a fixed bracket mounted on the vehicle body and a movable bracket supporting a column pipe, and the telescopic adjustment by which the movable bracket and column pipe can be moved or fixed is performed by loosening or tightening the fixed bracket.

Therefore, where the play of the steering wheel is present during such telescopic adjustment, good telescopic adjustment feel is lost. Accordingly, various means for preventing the play during telescopic adjustment have been developed and implemented. Japanese Patent Application Publication Nos. 2009-143299 and 2006-240327 represent such related art.

Japanese Patent Application Publication Nos. 2009-143299 and 2006-240327 are briefly described below. In the explanation of Japanese Patent Application Publication Nos. 2009-143299 and 2006-240327, the reference numerals are placed in parentheses to distinguish them from those in the explanation of the invention of the present application. In Japanese Patent Application Publication No. 2009-143299, as shown in FIG. 3 thereof, the spring (47) that impels the eccentric cam (46) and bolt (41) upward is provided, thereby causing the guide pieces (48, 48) to slide in the front-rear direction, while being pushed against the upper side of the telescopic elongated holes (23a, 23b) as shown in FIG. 3. As a result, no play occurs during telescopic operation.

With such a structure, the play of the eccentric cam (46) that is in direct contact with the spring (47) can be removed. However, the play of the bolt (41) disposed inside the eccentric cam (46) cannot be removed. This is because the bolt (41) is configured to be assembled by insertion into the eccentric cam (46), and a certain gap should be present between the eccentric cam (46) and the bolt (41) to enable the insertion of the bolt (41).

Since the gap is present, even though the eccentric cam (46) is impelled upward by the spring (47), the play between the bolt (41) and the eccentric cam (46) can be removed. Therefore, in the configuration described in Japanese Patent Application Publication No. 2009-143299, the play occurring during telescopic adjustment cannot be completely removed.

Further, a steering device is also known in which telescopic adjustment is performed from a different standpoint. Thus, a telescopic elongated hole is provided in a bracket portion, a bolt or the like is disposed so as to pass through the telescopic elongated hole, and the bolt is moved along the shape of the telescopic hole, thereby moving the steering wheel in the front-rear direction. In this case, where the bolt is moved to the initial end portion and final end portion in the longitudinal direction of the telescopic hole (telescopic operation limits), the problem is that since the end portions of the telescopic hole and the bolt are made from the same metal, metallic sound is generated when the two collide, and operation quietness and operation feel during collision (at the telescopic operation line) are lost.

In the configuration described in Japanese Patent Application Publication No. 2006-240327, the collar member (14) shown in FIG. 2B is pushed upward by a V-shaped spring shown close to the center of FIG. 2A. As a result the play is unlikely to occur during telescopic operation. In the configuration described in Japanese Patent Application Publication No. 2006-240327, the protruding portion (11) of the stopper buffer member (C) is inserted into and mounted on the fixing hole portion (6) of the attachment member (B) fixedly attached by welding to the steering column (4).

The stopper buffer member (C) is mounted to be positioned at both end locations in the longitudinal direction of the elongated hole (3) for adjustment, and the shaft portion of the bolt (13) abuts on the stopper buffer member (C), without abutting on both ends in the longitudinal direction of the elongated hole (3) for adjustment. As a result, the longitudinal end of the elongated hole (3) for adjustment and the shaft portion of the bolt (13) do not come into contact with each other and therefore no metallic sound is generated and good quietness and operation feel are maintained even when the components collide.

SUMMARY OF THE INVENTION

However, as shown in FIG. 2B of Japanese Patent Application Publication No. 2006-240327, the through hole (14a) is formed in the axial direction in the collar member (14), and the shaft portion of the bolt (13) is inserted therethrough. In such configuration described in Japanese Patent Application Publication No. 2006-240327, a certain gap occurs between the through hole (14a) and the bolt (13) and therefore there is still room for improvement in terms of preventing the play of the bolt (13). It is an object of (a technical problem to be resolved by) the present invention to provide a steering device that can remove the play during telescopic adjustment and ensure quietness at the telescopic operation limits.

The inventors have conducted a comprehensive research aimed at the resolution of the abovementioned problems and the results obtained demonstrate that the problems can be resolved by the invention as in aspect 1 that relates to a steering device including: a column pipe; an outer housing having a grasping portion that can move and fix the column pipe in a front-rear direction, a clamp portion that diametrically expands and contracts the grasping portion, and a tightening hole; a fixed bracket having fixing side portions that clamp both lateral sides of the outer housing and a support hole; a stopper bracket that is fixedly attached to the column pipe and has stopper plates formed at both ends in the front-rear direction of a movable guiding portion; a tightening member having a bolt shaft; a slide guide having shaft support portions that support the bolt shaft; an elastic buffer member that is mounted on an abutment location of the slide guide and the stopper bracket; and an elastic pushing member, wherein the bolt shaft is passed through the tightening hole of the outer housing and the support hole of the fixed bracket along the shaft support portions of the slide guide, and the slide guide abuts on the movable guiding portion of the stopper bracket and is elastically impelled by the elastic pushing member.

The abovementioned problem is also resolved by the invention as in aspect 2 relating to the steering device according to aspect 1, wherein the buffer member is mounted on the slide guide and the bolt shaft of the tightening member is clamped by the buffer member. The abovementioned problem is also resolved by the invention as in aspect 3 relating to the steering device according to aspect 1, wherein the buffer member has an elastic head portion, a neck portion, and attachment expanded portions, the neck portion is mounted on a buffer member mounting portion of the slide guide, the attachment expanded portions face each other inside the slide guide, and the bolt shaft of the tightening member is clamped in the front-rear direction by the attachment expanded portions.

The abovementioned problem is also resolved by the invention as in aspect 4 relating to the steering device according to any one of aspects 1, 2 and 3, wherein the slide guide has a base, a fixed guiding portion having notch-like shaft support portions formed therein, and a guide protrusion guiding the movable guiding portion in an axial direction, torsion coil spring portions are formed at both axial ends of the pushing shaft portion in the elastic pushing member, and the pushing shaft portion abuts on the slide guide.

The abovementioned problem is also resolved by the invention as in aspect 5 relating to the steering device according to any one of aspects 1, 2 and 3, wherein the slide guide is configured so that side plate portions having the shaft support portions are formed at both lateral sides of a top base and the elastic pushing member is mounted on a rear surface side of the top base, the top base abuts on the movable guiding portion of the stopper bracket, the bolt shaft is inserted into the shaft support portions, and the elastic pushing member is abutted on the bolt shaft so as to be pushed against the bolt shaft at all times.

The abovementioned problem is also resolved by the invention as in aspect 6 relating to the steering device according to aspect 5, wherein the elastic pushing member is constituted by an elastic plate portion formed in a band-like shape and an attachment piece, locking portions on which the attachment piece is locked are formed above the side plate portions of the slide guide, and the elastic plate portion is mounted between the side plate portions. The abovementioned problem is also resolved by the invention as in aspect 7 relating to the steering device according to aspect 5, wherein the buffer member and the elastic pushing member are molded integrally as a same member.

With the invention as in aspect 1, the slide guide abuts on the movable guiding portion of the stopper bracket and also elastically impelled by the elastic pushing member. Therefore, the column pipe can be guided by the slide guide and moved in the front-rear direction in a stable state, the play can be prevented, and the operation feel during telescopic adjustment can be improved. Further, when the tightening with the tightening member is released during telescopic adjustment, the column pipe can be held in an appropriate position and a sliding load of the column pipe on the outer column is stabilized.

With the invention as in aspect 2, the bolt shaft of the tightening member is directly grasped by the elastic buffer member. Therefore, the play of the bolt shaft itself can be prevented. As a result, the play during telescopic adjustment can be prevented more effectively. The invention as in aspect 3 also provides almost the same effect as the invention as in aspect 2. With the invention as in aspect 3, the buffer member can be fixed by fitting the neck portion of the buffer member into the buffer member mounting portion of the slide guide and the operation efficiency can be improved.

Further, the separation of the buffer member in the front-rear direction of the slide guide can be prevented by the elastic head portion and attachment expanded portion of the buffer member. With the invention as in aspect 4, a guide protrusion that guides the movable guiding portion in the axial direction is formed in the slide guide, and the elastic pushing member abuts on the slide guide and elastically impels the slide guide, thereby ensuring more uniform abutment on the movable guiding portion of the stopper bracket. As a result, the movable guiding portion of the stopper bracket can move in a stable state in the front-rear direction, while being guided by the guide protrusion of the slide guide. As a result, the telescopic adjustment can be stabilized.

With the invention as in aspect 5, the elastic pushing member is mounted on the rear surface side of the top base of the slide guide. Therefore, a structure is obtained in which the elastic pushing member is accommodated inside the slide guide and the entire device can be reduced in size. Further, since the top base abuts on the movable guiding portion of the stopper bracket in a snap-like state, the movable guiding member of the stopper bracket can move in a stable state in the front-rear direction, while being guided by the top base of the slide guide. Furthermore, since the bolt shaft of the tightening member is inserted into the shaft support portion of the slide guide and configured to push the elastic pushing member at all times, the slide guide and elastic pushing member can be prevented from falling down during the assembly operation.

With the invention as in aspect 6, the elastic pushing member is formed in a band-like shape and the entire elastic pushing member can be reduced in size. Further, since locking portions for locking the attachment piece are formed above both side plate portions of the slide guide, the elastic pushing member can be mounted in a simple manner. Further, with the configuration in which the elastic plate portion is mounted between the two side plate portions, the longitudinal direction of the band-like elastic pushing member coincides with the axial direction of the bolt shat, the abutment range of the bolt shaft and the elastic pushing member can be expanded, and the slide guide can be more reliably abutted on the movable guiding portion. Further, the configuration can be obtained in which the load is dispersed therebetween and the bolt shaft is unlikely to be damaged. With the invention as in aspect 7, the buffer member and the elastic pushing member are molded integrally as the same member, thereby making it possible to reduce the number of parts and increase the assembling efficiency.

BRIEF DESCRIPTION OF THE DRAWINGS

FIG. 2A is a bottom view of the principal portion of the first embodiment of the present invention from which the fixed bracket has been removed, FIG. 2B is a principal vertical sectional side view, and FIG. 2C is a front view;

FIG. 3A is a perspective view of the slide guide and elastic pushing member in the first embodiment of the present invention, FIG. 3B is a perspective view of the slide guide, FIG. 3C is a vertical sectional front view of the slide guide, FIG. 3D is a vertical sectional side view of the slide guide, and FIG. 3E is a perspective view of the stopper bracket;

FIG. 6A is a vertical sectional side view of the outer housing, FIG. 6B is a sectional view along the Ya-Ya line in FIG.

6A, FIG. 6C is a sectional view along the Xa-Xa line in FIG. 6A, and FIG. 6D is a sectional view along the Xb-Xb line in FIG. 6A;

DESCRIPTION OF THE PREFERRED EMBODIMENTS

Figure 1A:
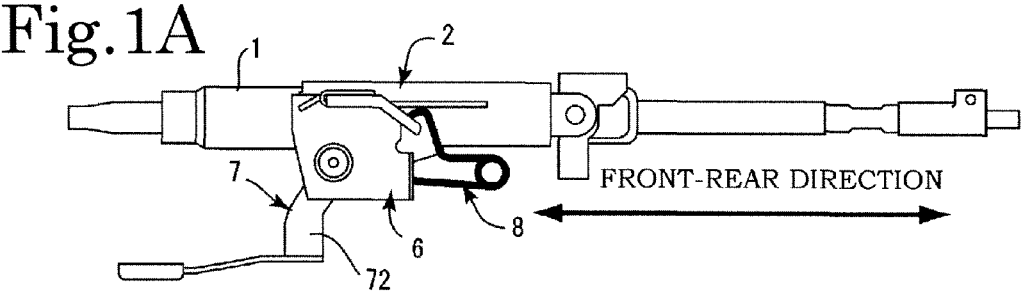
FIG. 1A is a side view illustrating the first embodiment of the present invention.
Figure 1B:
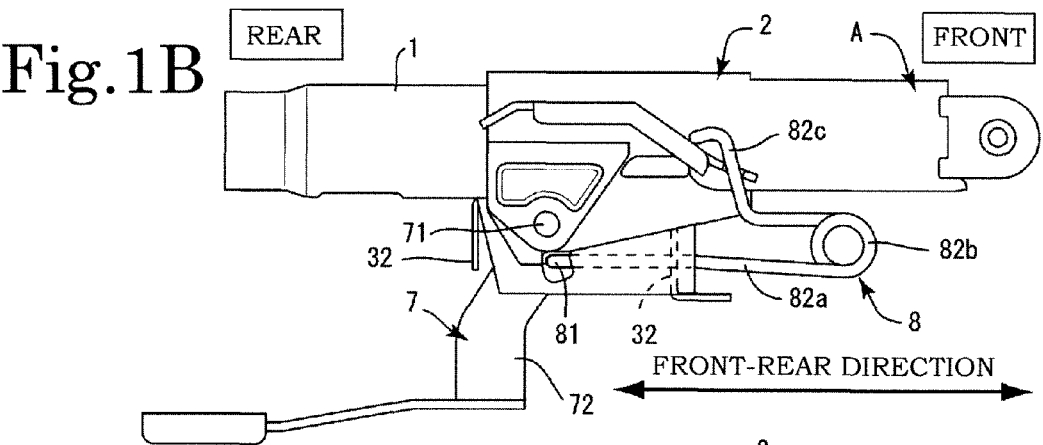
FIG. 1B is a principal view illustrating the present invention.
Figure 1C:
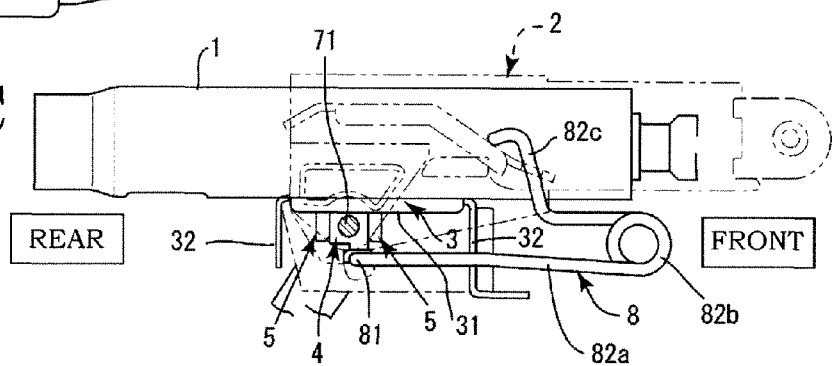
FIG. 1C is a side view shown in FIG. 1B from which the outer housing has been removed and FIG. 1D is a bottom view of the principal portion in accordance with the present invention.

Embodiments of the present invention will be described below with reference to the appended drawings. The present invention includes the first embodiment and the second embodiment. The explanation will be started from the first embodiment. As shown in FIG. 1, the principal configuration in accordance with the present invention includes a column pipe 1, an outer housing 2, a stopper bracket 3, a slide guide 4, a buffer member 5, a fixed bracket 6, a tightening member 7, and an elastic pushing member 8.

Where the tightening of the tightening member 7 is released during telescopic adjustment, the column pipe 1 and the slide bracket 3 fixedly attached to the column pipe 1 can move in the front-rear direction with respect to the outer housing 2. The slide guide 4 supports a bolt shaft 71 of the tightening member 7 inserted into a tightening hole 221 formed in the below-described outer housing 2 and therefore does not move in the front-rear direction and remains immobile. The slide guide 4 abuts on a movable guiding portion of the slide bracket 3. Further, a steering shaft is mounted, so that it can rotate in the circumferential direction, on the column pipe 1.

The outer housing 2 is composed mainly of an aluminum alloy and, as shown in FIG. 1 and FIG. 6, constituted by a grasping portion 21 and two clamping portions 22. The grasping portion 21 is constituted by a grasping body portion 211 and a separation gap portion 212. The grasping body portion 211 is formed in a substantially cylindrical shape, has a grasping inner circumferential surface portion 211a formed in a hollow shape inside the grasping body portion, and serves to grasp the column pipe 1. The grasping body portion 211 is formed to be slightly larger than the outer diameter of the column pipe 1. The separation gap portion 212 is formed at the diametrically lower side of the grasping body portion 211 (see FIG. 6).

The separation gap portion 212 is a portion in which the grasping body portion 211 is completely or substantially completely separated from the axially front side along the rear side (see FIGS. 6A, 6B, and 6D) and which is formed to have a substantially slit-like shape extending along the axial direction of the grasping body portion 211. Both lateral sides of the separation gap portion 212 are separation edges 212a, 212a. The separation edges 212a, 212a are flat surfaces along the axial direction, and when the separation edges are brought close to each other, the diameter of the grasping inner circumferential surface portion 211a decreases, and the column pipe 1 accommodated and mounted inside the grasping body portion 211 can be tightened and locked (fixed).

The two separation edges 212a, 212a are parallel (inclusive of substantially parallel) to each other, and therefore the spacing therebetween is uniform (inclusive of substantially uniform) along the axial direction. Two clamp portions 22, 22 are formed in the lower portion of the grasping portion 21 in the locations of the two separation edges 212a, 212a of the separation gap portion 212. The clamp portions 22 are formed in a substantially rectangular parallelepiped shape (block). The shape of the two clamp portions 22, 22 has a left-right symmetry, and the clamp portions are formed integrally on the left and right separation edges 212a, 212a of the separation gap portion 212, respectively (see FIG. 6B).

The clamp portion 22 is formed in a rectangular or triangular shape when viewed from the side surface along the axial direction of the grasping portion 21. The surfaces on the laterally outer sides of the two clamp portions 22, 22 called outer side surfaces 22a. The outer side surfaces 22a are almost flat surfaces and so configured that when the outer side surfaces are clamped by two fixing side portions 61, 61 of the below-described fixing bracket 6, the fixing side portion 61 and the outer side surface 22a of the clamp portion 22 can be brought into surface contact (inclusive of substantially surface contact) with each other (see FIG. 2C). The outer side surface 22a of the clamp portion 22 may have recesses here and there with consideration for weight reduction or casting plan.

In the two clamp portions 22, 22, the tightening holes 221, 221 are formed in the lateral direction of the grasping body portion 211 and in the direction perpendicular to the front-rear direction of the outer housing 2. The bolt shaft 71 of the below-described tightening member 7 is inserted into the tightening holes 221, 221. An arm section A composed of two arm portions 23, 23 and a shaft support portion 24 is formed, as shown in FIGS. 6C and 6D at the front side in the front-rear direction of the grasping portion 21. The front-rear direction as referred to herein is based on the front-rear direction of the automobile after the present steering device has been mounted on the automobile.

The two arm portions 23, 23 of the arm section A are formed such that the positions at both sides in the lateral direction of the grasping body portion 211 serve as the attachment positions, and the two arm portions 23, 23 are formed to extend outward on the front side in the axial direction of the grasping portion 21 from the axial end of the grasping portion 21 (see FIGS. 6C and 6D). Further, the two arm portions 23, 23 are formed so that the distance between the two arm portions 23, 23 increases gradually with a transition in the outward direction on the front side in the axial direction of the grasping portion 21. The shaft support portion 24 is formed between the two arm portions 23, 23, and a bearing is mounted on the shaft support portion 24.

Figure 4A:
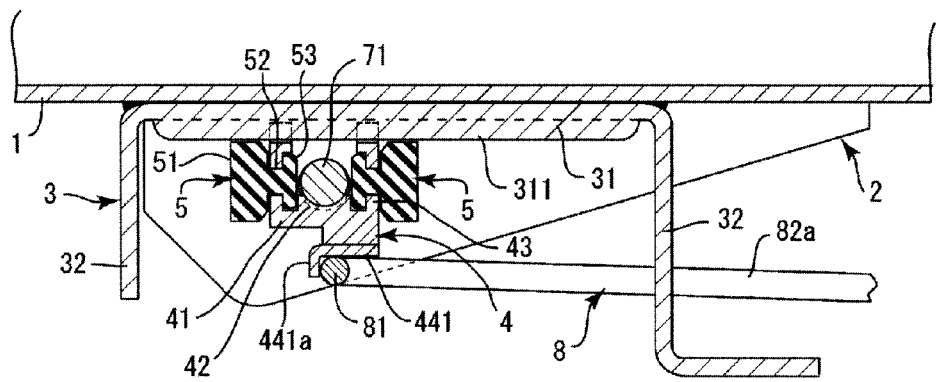
FIG. 4A is an enlarged vertical sectional side view of the principal portion in the first embodiment of the present invention.

Further, the stopper bracket 3 is composed of a movable guiding portion 31 and stopper plates 32, 32 formed at both ends in the front-rear direction of the movable guiding portion 31. The stopper bracket 3 is attached at a position at a diametrically lower end of the column pipe 1, as shown in FIGS. 2B, 3E, and 4A, and can move together with the column pipe 1 in the front-rear direction with respect to the outer housing 2 during telescopic adjustment.

The movement amount in the front-rear direction during telescopic operation is controlled by the length in the front-rear direction of the stopper bracket 3, that is, the distance between the stopper plates 32, 32, and the configuration is such that no member that can be an obstacle is present in the vicinity of the stopper bracket 3. With such a configuration, the distance between the two stopper plates 32, 32 can be set as appropriate and the movement amount in the front-rear direction of the steering wheel during telescopic adjustment can be set with a high degree of freedom. The movable guiding portion 31 is in the form of a narrow long plate, and a stopper position during telescopic adjustment can be easily set by setting the plate length.

Figure 4B:
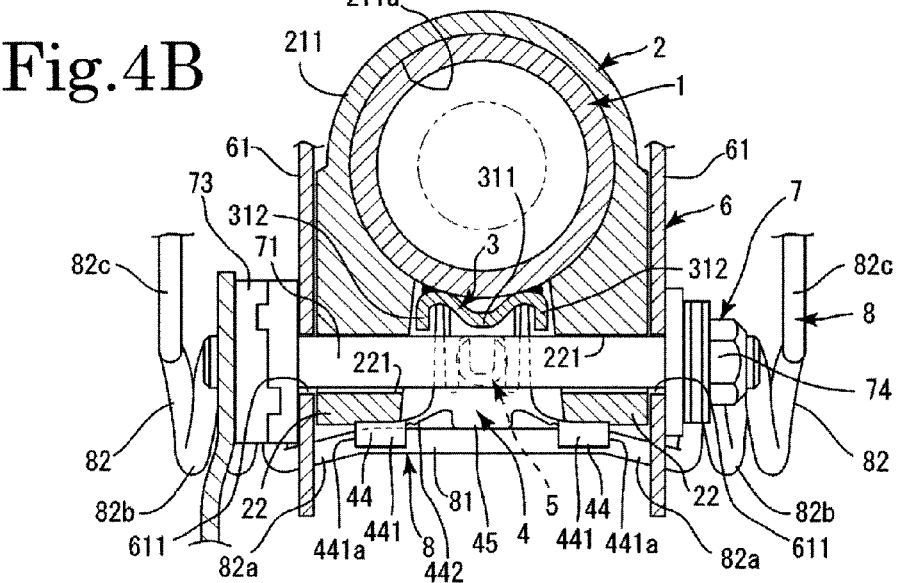
FIG. 4B is a principal sectional front view.

In the stopper bracket 3, part of the movable guiding portion 31 is fixedly attached by an attaching means such as welding at a position at the diametrically lower end of the column pipe 1, and a surface is obtained of a concave shape (part of a circle) matching the shape of the column pipe 1 (see FIG. 4B). As for the cross-sectional shape of the movable guiding portion 31 in the direction perpendicular to the longitudinal direction thereof, a protruding rib 311 is formed in the lateral central portion, the protruding rib bulging downward in a substantially circular arc shape. The protruding rib 311 is formed as far as a position slightly in front of both ends in the front-rear direction along the front-rear direction (longitudinal direction) of the movable guiding portion 31.

Figure 4C:
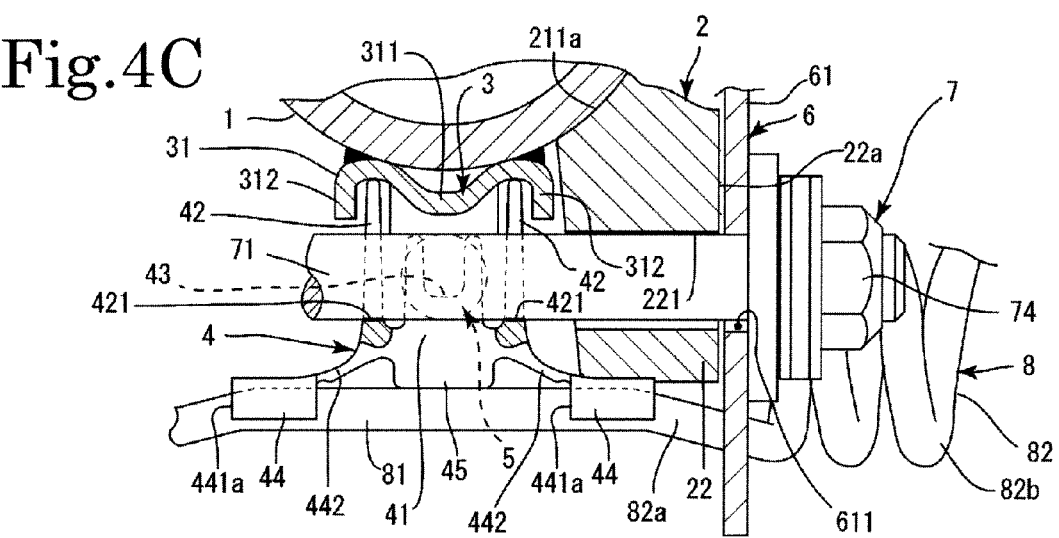
FIG. 4C is a principal enlarged view of the configuration shown in FIG. 4B.

Sagging pieces 312, 312 are formed at both lateral sides of the movable guiding portion 31 (see FIGS. 3E and 4). Thus, the two sagging pieces 312, 312 are formed so as to enclose both lateral sides of the protruding rib 311. Further, the protruding rib 311 and the two sagging pieces 312, 312 are formed continuously in a circular arc shape (see FIG. 4C). The two stopper plates 32, 32 are formed in a substantially flat band-like shape and formed by bending at a right angle with respect to the movable guiding portion 31. In a state in which the stopper bracket 3 is fixedly attached to the column pipe 1, the two stopper plates 32, 32 are set at a right angle with respect to the longitudinal direction of the column pipe 1. Thus, the two stopper plates 32, 32 are formed to face downward.

Further, the slide guide 4 is constituted by a base 41, fixed guiding portions 42, and buffer member mounting portions 43, and the fixed guiding portions 42, 42 and buffer member mounting portions 43, 43 are formed opposite each other at the base 41 (see FIGS. 3A to 3D). Further, push portions 44, 44 are formed at the base 41. The base 41 is formed in a substantially rectangular or square shape. The slide guide 4 is formed from a synthetic resin, and preferably has certain elasticity while still having a certain structural strength.

The slide guide 4 is mounted on the movable guiding portion 31 of the stopper bracket 3 (see FIGS. 2B and 4A). The buffer member mounting portions 43, 43 are formed opposite each other along the front-rear direction of the base 41 of the slide guide 4. The fixed guiding portions 42 are also formed opposite each other along the lateral direction (left-right direction) of the base 41. In the slide guide 4, the stopper bracket 3 is elastically impelled upward by the below-descried elastic pushing member 8, while enveloping the bolt shaft 71 of the tightening member 7.

As shown in FIGS. 3B and 3C, the fixed guiding portions 42 are formed in a plate-like shape, and shaft support portions 421 in the form of a substantially U-like notch are formed therein. The shaft support portions 421 serve as an enclosure in the diametrical direction of the bolt shaft 71 of the tightening member 7, that is, to enclose the outer circumference of the bolt shaft 71. The fixed guiding portions 42 are formed with a distance therebetween being slightly larger than the diameter of the bolt shaft 71 of the tightening member 7 on the base 41. The fixed guiding portions 42 function to prevent the displacement of the bolt shaft 71 of the tightening member 7.

Guide protrusions 422, 422 are formed on both sides of the shaft support portions 421 of the fixed guiding portions 42. The two pairs of guide protrusions 422, 422 are accommodated and abutted (inclusive of a substantial abutment state) between the sagging pieces 312 and both lateral sides of the protruding rib 311 formed in the movable guiding portion 31 of the stopper bracket 3 (see FIGS. 4B and 4C). With such a configuration, the column pipe 1 can move in a state of good stability in the front-rear direction, without rotating in the circumferential direction. The buffer member 5 is mounted on the buffer member mounting portion 43.

As shown in FIGS. 3B to 3D, push portions 44, 44 are formed at both lateral sides of the base 41. The push portion 44 is constituted by a push plate 441 and an elastic arm piece 442. First, the elastic arm pieces 442 are formed so as to tilt slightly downward from both lateral end portions of the base 41 and then the push plates 441 are formed from the lower ends of the elastic arm pieces 442. The push plate 441 has a locking edge 441a in the form of a flat substantially vertical surface at the rear end in the front-rear direction.

The push plate 441 is a zone that receives an elastic impelling force from a pushing shaft portion 81 of the below-described elastic pushing member 8, and the push plate 441 and the locking edge 441a serve to receive reliably the pushing shaft portion 81 and prevent the pushing shaft portion from separation. Further, a push protruding portion 45 is formed at the lower surface side of the base 41. It is preferred that the push protruding portion 45 be formed such that the position of the lower surface thereof be slightly lower than the lower surface of the push plate 441.

Figure 5A:
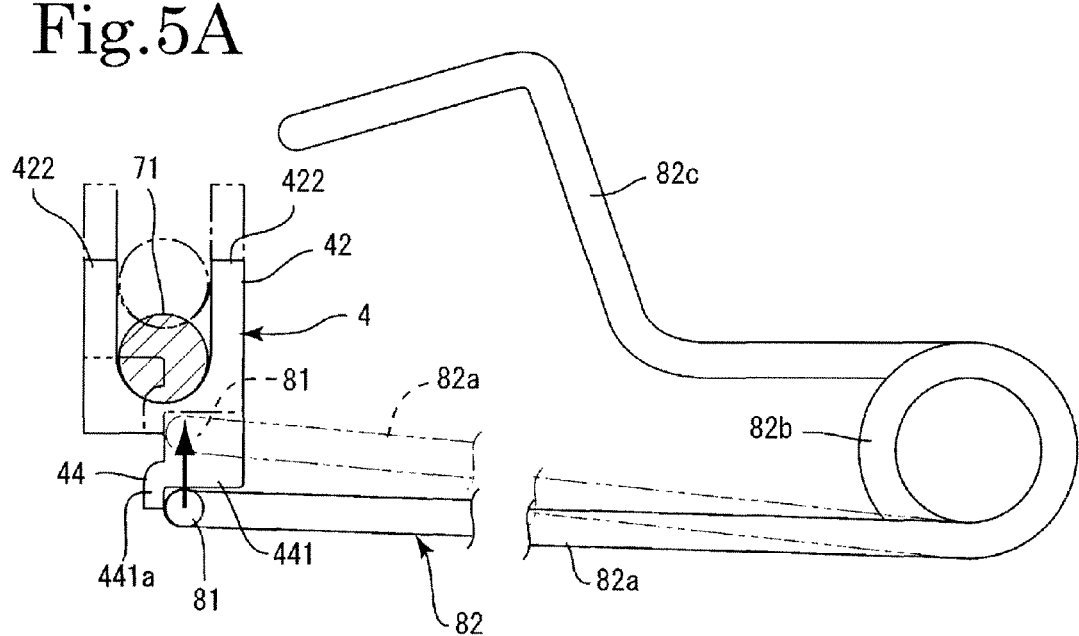
FIGS. 5A to 5C are operation diagrams of the first embodiment.
Figure 5B:
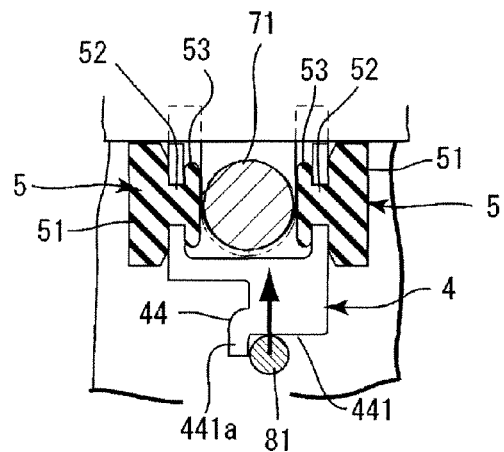

The buffer member 5 is from an elastic rubber and constituted by an elastic head portion 51, a neck portion 52, and an attachment expanded portion 53 (see FIGS. 3A, 4A, and 5B). The elastic head portion 51 has a substantially flattened rectangular parallelepiped shape or a substantially cylindrical shape. The neck portion 52 has a round cross section, and the attachment expanded portion 53 has a substantially disk-like shape or a substantially cylindrical shape. The attachment expanded portion 53 may be provided with a recess of a shape corresponding to the diameter of the bolt shaft 71 of the below-described tightening member 7.

The buffer member 5 is joined and fixed by mounting the neck portion 52 on the buffer member mounting portion 43 of the slide guide 4. The elastic head portion 51 and the attachment expanded portion 53 serve to prevent the separation of the buffer member 5 in the front-rear direction of the slide guide 4. Two buffer members 5 are mounted on the slide guide 4 and fixed to respective buffer member mounting portions 43, 43. In the buffer members 5, 5, the two attachment expanded portions 53, 53 face each other on the base 41.

The distance between the two attachment expanded portions 53, 53 is less than the diameter of the bolt shaft 71 of the tightening member 7, and the bolt shaft 71 is clamped and fixed in the front-rear direction by the two attachment expanded portions 53, 53, thereby preventing the play of the bolt shaft 71 in the front-rear and up-down directions (see FIGS. 4A and 5B). The distance between the two attachment expanded portions 53, 53 is not necessarily less than the diameter of the bolt shaft 71. Thus, any distance may be used, provided that the two attachment expanded portions 53, 53 abut on the bolt shaft 71 and prevent the play of the bolt shaft 71. The fixed bracket 6 is constituted by fixing side portions 61, 61 and an upper surface portion 62. The support holes 611, 611 are formed in the fixing side portions 61, 61.

A locking hole 621 for attaching the elastic pushing member 8 is formed in the upper surface portion 62. In the fixed bracket 6, both outer side surfaces 22a, 22a of the outer housing 2 are clamped by the two fixing side portions 61, 61, the fixed bracket is set so that the positions of the tightening holes 221, 221 and the positions of the support holes 611, 611 match, and the bolt shaft 71 of the tightening member 7 is inserted (see FIGS. 2C, 4B, and 4C). The tightening member 7 is constituted by the bolt shaft 71, a lock lever 72, a tightening cam 73, and a nut 74 (see FIGS. 2C, 4B, and 4C). The tightening member 7 is mounted together with lock lever 72 and the tightening cam 73 by the nut 74.

Figure 1D:
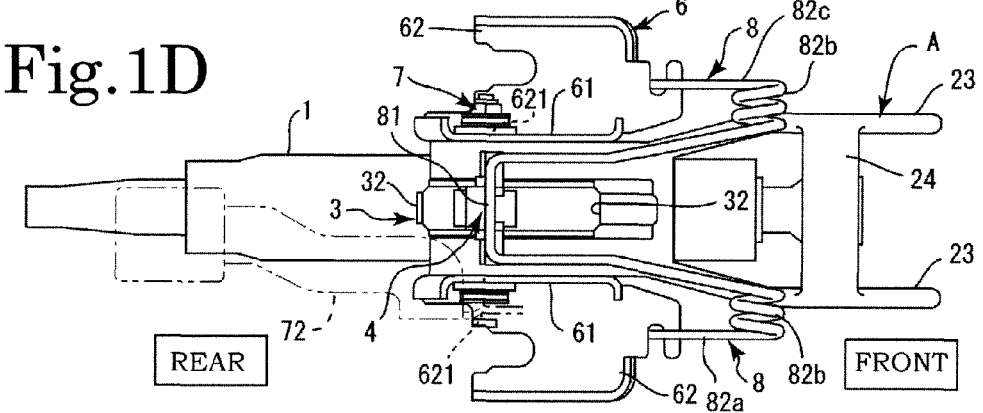

As shown in FIGS. 1D and 3A, in the elastic pushing member 8, torsion coil spring portions 82, 82 are formed from both lateral ends in substantially the same direction. More specifically, an elastic shaft portion 82a is formed at a substantially right angle from an axial end of the pushing shaft portion 81, a coil portion 82b is formed at the other end of the elastic shaft portion 82a, and a locking shaft portion 82c is formed at the other end of the coil portion 82b.

The locking shaft portion 82c is locked and fixed to the upper surface portion 62 of the aforementioned fixed bracket 6 and elastically impels the pushing shaft portion 81 upward via the coil portion 82b. The configuration in which the elastic pushing member 8 is mounted on the fixed bracket 6 substantially bridges or spans the outer housing 2 to obtain a configuration in which the pushing shaft portion 81 pushes the slide guide 4 (see FIG. 1D). Further, the elastic pushing member 8 has a function of preventing the steering wheel from falling down under gravity during the tilting operation.

Figure 7A:
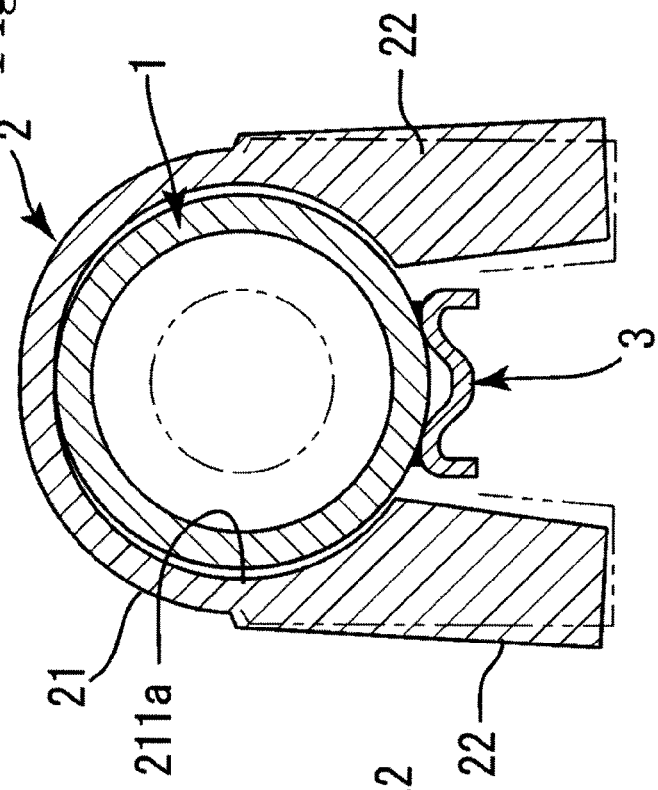
FIGS. 7A and 7B are schematic drawings illustrating the tightened state of the column pipe of the outer housing.
Figure 7B:
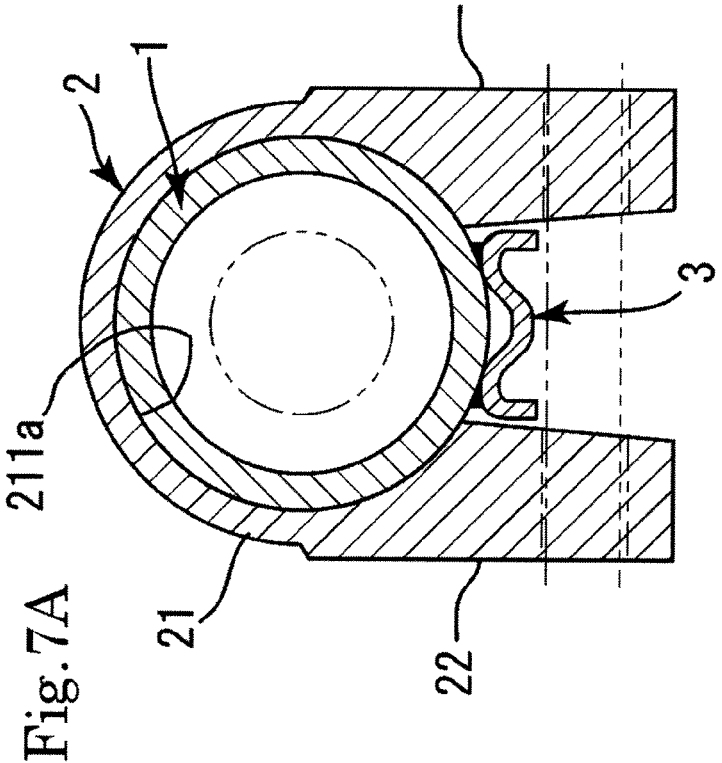

When the column pipe 1 having the stopper bracket 3 fixedly attached thereto is accommodated and mounted on the grasping body portion 211 of the grasping portion 21, the stopper bracket 3 is accommodated in the separation gap portion 212 (see FIG. 7). Therefore, the stopper bracket 3 is formed to have a lateral size less than that between the two separation edges 212a, 212a of the separation gap portion 212 after tightening with the tightening member 7, that is, in a state in which the two separation edges are the closest to each other.

As a result, when the column pipe 1 slides inside the grasping portion 21 during telescopic adjustment or the like, the slide bracket 3 is restricted so as to prevent idle rotation in the circumferential direction of the column pipe 1 inside the separation gap portion 212. Furthermore, the stopper bracket 3 can be moved in a stable state in the front-rear direction by the guide protrusion 422 of the slide guide 4, and the column pipe 1 can be moved in a stable state in the front-rear direction, while preventing unnecessary rotation thereof in the circumferential direction with respect to the outer housing 2.

Further, during telescopic adjustment, the stopper bracket 3 moves together with the column pipe 1 in the front-rear direction. Therefore, the stopper plates 32, 32 also move in the front-rear direction, but the stopper plates abut on the buffer member 5 mounted on the buffer member mounting portion 43 of the slide guide 4 and the movement thereof in the front-rear direction of telescopic adjustment is restricted. Since the stopper plate 32 of the stopper bracket 3 abuts on the buffer member 5, shocks during telescopic adjustment can be reliably absorbed and metallic noise can be prevented.

Figure 5C:
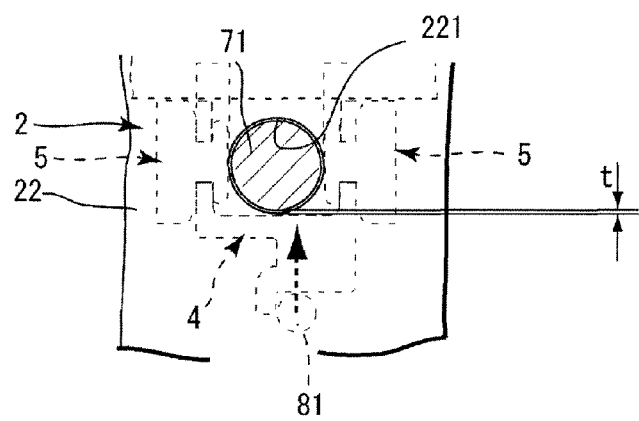

In the present invention, the bolt shaft 71 of the tightening member 7 passes through the tightening holes 221, 221 of the outer housing 2, the support holes 611, 611 formed in the fixing side portions 61, 61 of the fixed bracket 6, and the shaft support portions 421, 421 of the fixed guiding portions 42, 42 of the slide guide 4. The inner diameter of the tightening hole 221 of the outer housing 2 and the inner diameter of the support hole 611 of the fixed bracket 6 are slightly larger than the diameter of the bolt shaft 71, and a slight gap t is formed therebetween (see FIG. 5C). However, since the bolt shaft 71 is directly clamped by the attachment expanded portion 53 of the buffer member 5 from the front-rear direction, the play of the bolt shaft 71 in the front-rear direction and up-down direction is prevented. As a result, the play during telescopic adjustment is prevented.

Further, the elastic pushing member 8 is configured so that the pushing shaft portion 81 elastically impels the slide guide 4 upward by the torsion coil spring portions 82, 82 (see FIG. 5A). Thus, the slide guide 4 is pushed against the stopper bracket 3 by the pushing shaft portion 81 of the elastic pushing member 8 (see FIG. 5B). More specifically, where the pushing shaft portion 81 pushes the push plates 441, 441 of the slide guide 4, the guide protrusion 422 is somewhat deflected and the slide guide 4 can uniformly push the stopper bracket 3 upward. The column pipe 1 can be also pushed upward via the stopper bracket 3. When the tightening with the tightening member 7 is released during telescopic adjustment, the column pipe 1 can be held in the appropriate position and the steering wheel can be moved with better stability in the front-rear direction.

The second embodiment of the present invention will be described below with reference to FIGS. 8 to 13. In the second embodiment, the configurations of the slide guide 4 and the elastic pushing member 8 are different from those in the first embodiment. The slide guide 4 is formed from a synthetic resin and, as shown in FIGS. 8 and 9A to 9C, is formed in a substantially cubic hollow housing by the top base 46, the side plate portion 47, a front plate portion 481, and a rear plate portion 482. The side plate portions 47, 47 are formed to sag downward from both lateral ends of the top base 46, the front plate portion 481 is formed to sag at the front end side in the front-rear direction of the top base 46, and the rear plate portion 482 is formed to sag at the rear end side (see FIGS. 9B and 9C).

The shaft support portions 421, 421 are formed in the two side plate portions 47, 47. The shaft support portion 421 in the second embodiment is notch-like formed as a void portion of a gate-like shape or an inverted U-like shape in which the semicircle is on the top (see FIGS. 9A and 9B). The top base 46 is formed to have a substantially square or substantially rectangular shape and also formed as an arc-like receding surface that has the largest depth in the middle portion thereof in the lateral direction (see FIG. 9C).

The top base 46 serves to abut on the movable guiding portion 31 of the stopper bracket 3 and to impel the movable guiding portion 31 at all times so that the movable guiding portion is pushed elastically (see FIG. 8). The arc-like receding surface of the top base 46 is formed to be substantially equal to the arc-like cross-sectional shape of the movable guiding portion 31 of the stopper bracket 3. The buffer member mounting portions 43, 43 are respectively formed in the front plate portion 481 and the rear plate portion 482 positioned in the front-rear direction of the slide guide 4 (see FIGS. 9A and 9C).

Figure 9A:
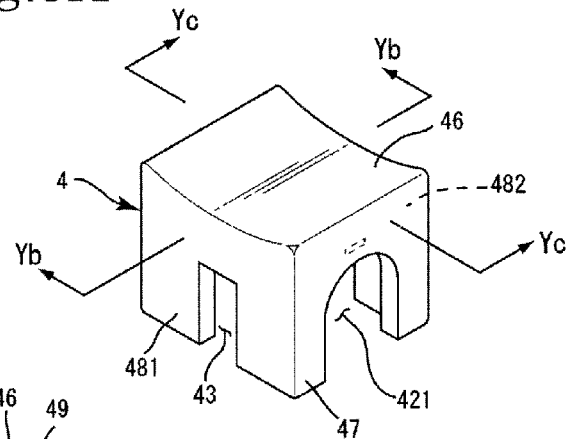
FIG. 9A is a perspective view of the slide guide in the second embodiment.
Figure 9B:
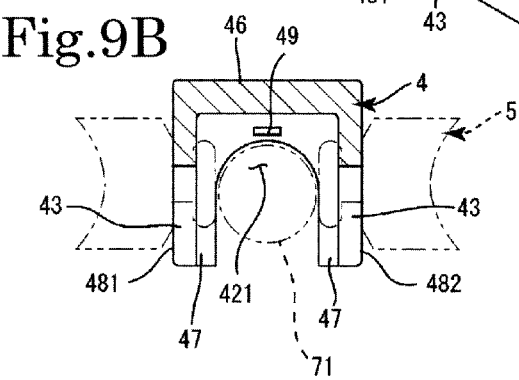
FIG. 9B is a sectional view along the Yb-Yb line in FIG. 9A.
Figure 9C:
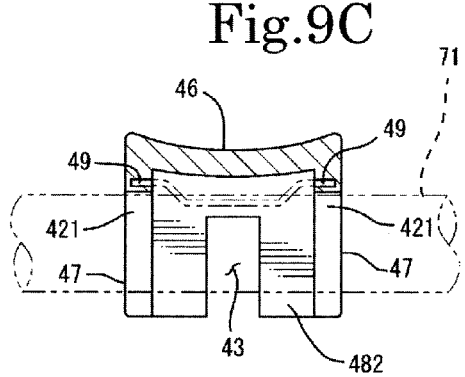
FIG. 9C is a sectional view along the Yc-Yc line in FIG. 9A.
Figure 9D:
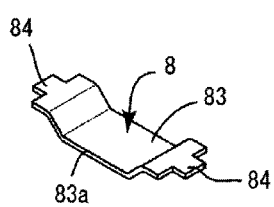
FIG. 9D is a perspective view of the elastic pushing member in the second embodiment.
Figure 9E:
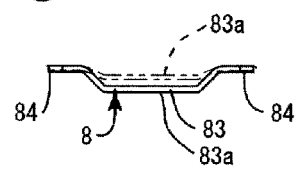
FIG. 9E is a side surface view of the elastic pushing member in the second embodiment.
Figure 9F:
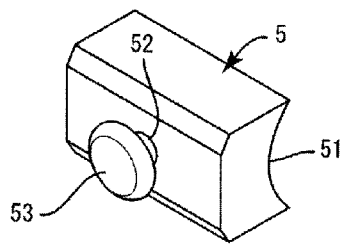
FIG. 9F is a perspective view of the buffer member.
Figure 9G:
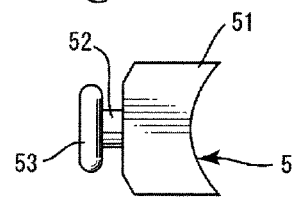
FIG. 9G is a side view of the buffer member.

The elastic pushing member 8 is formed from a metallic band-shaped material and constituted by the elastic plate portion 83 and the attachment piece 84 (see FIGS. 9D and 9E). The elastic plate portion 83 has a rectangular shape when viewed from above, and the attachment pieces 84, 84 are formed at both sides in the longitudinal direction thereof. The elastic plate portion 83 has formed therein a flat receding portion 83a that is formed as a substantially flat plate or a flat concavity in a substantially middle location in the longitudinal direction thereof, and the location of the flat receding portion 83a is a deformation zone (see FIGS. 9D, 9E, and 12).

Thus, where an external load is applied to the flat receding portion 83a, the portion is deformed from a flat concave shape to an almost flat shape, and this deformation generates an elastic force serving as a restoration force. The attachment piece 84 is formed as a small protrusion (see FIG. 9D) and mounted between the side plate portions 47, 47 of the slide guide 4, as described hereinbelow (see FIG. 10). The elastic pushing member 8 may be formed from a rubber or a resin and may be mounted between the front plate portion 481 and the rear plate portion 482 of the slide guide 4.

More specifically, lock portions 49 are formed at both side plate portions 47, 47 of the slide guide 4 and in positions above the upper ends of the shaft support portions 421, 421 (see FIGS. 9B and 9C). The attachment pieces 84 of the elastic pushing member 8 are disposed on the lock portions 49. The lock portions 49 are formed as holes at the inner surface sides of the side plate portion 47, the two attachment pieces 84, 84 of the elastic pushing member 8 are inserted into the two lock portions 49, 49, and the elastic pushing member 8 is mounted in a position on the lower surface side of the top base 46. The lock portion 49 is present in the form of a groove or a through hole in the side plate portion 47. The lock portions 49 of one of the side plate portions 47, 47 may be of a type such that is formed continuously as a notch from the upper end of the shaft support portion 421 (see FIG. 11).

Figure 10:
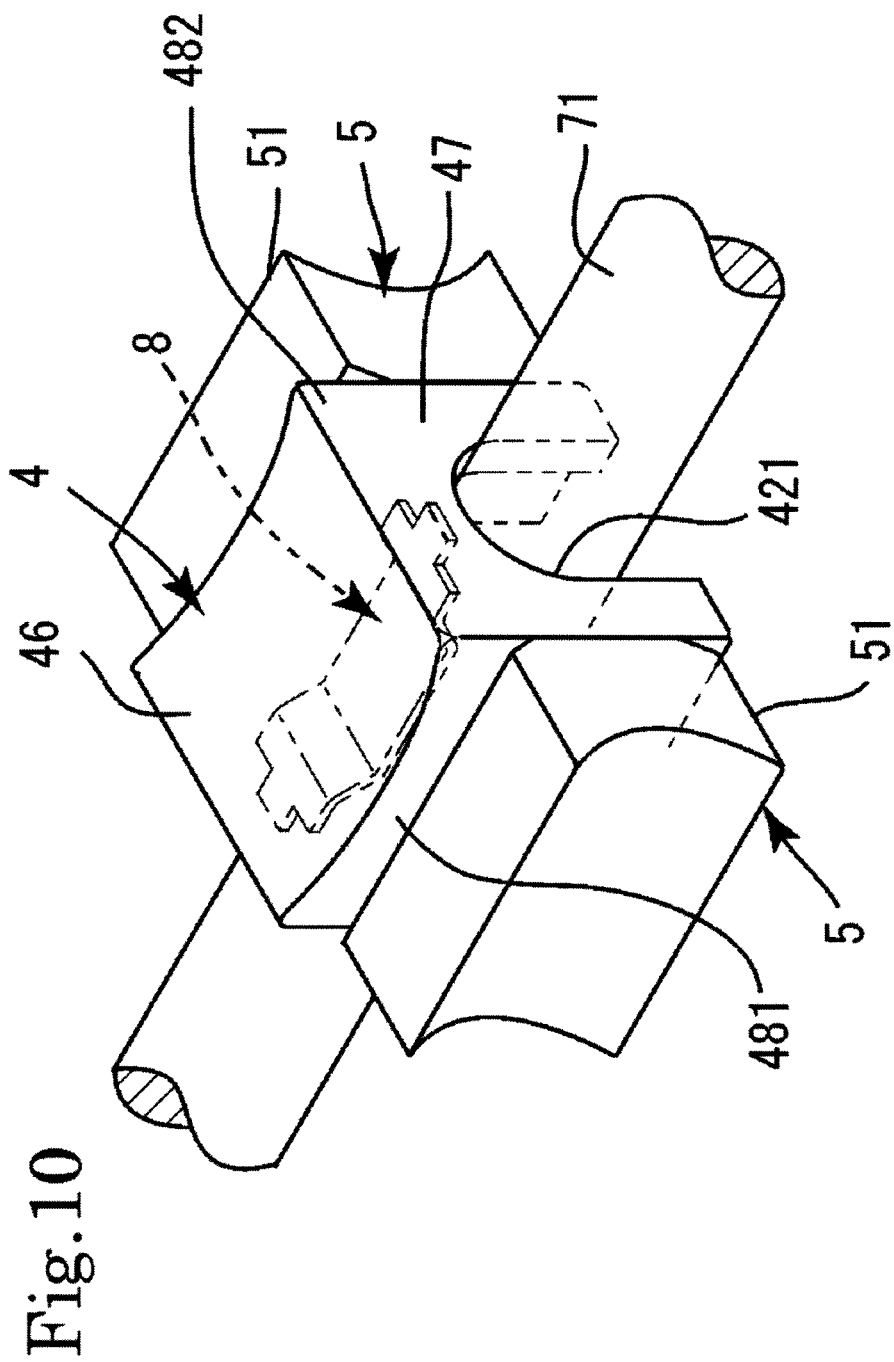
FIG. 10 is a perspective view illustrating the assembled state of the slide guide, elastic pushing member, bolt shaft, and buffer member in the second embodiment.
Figure 11:
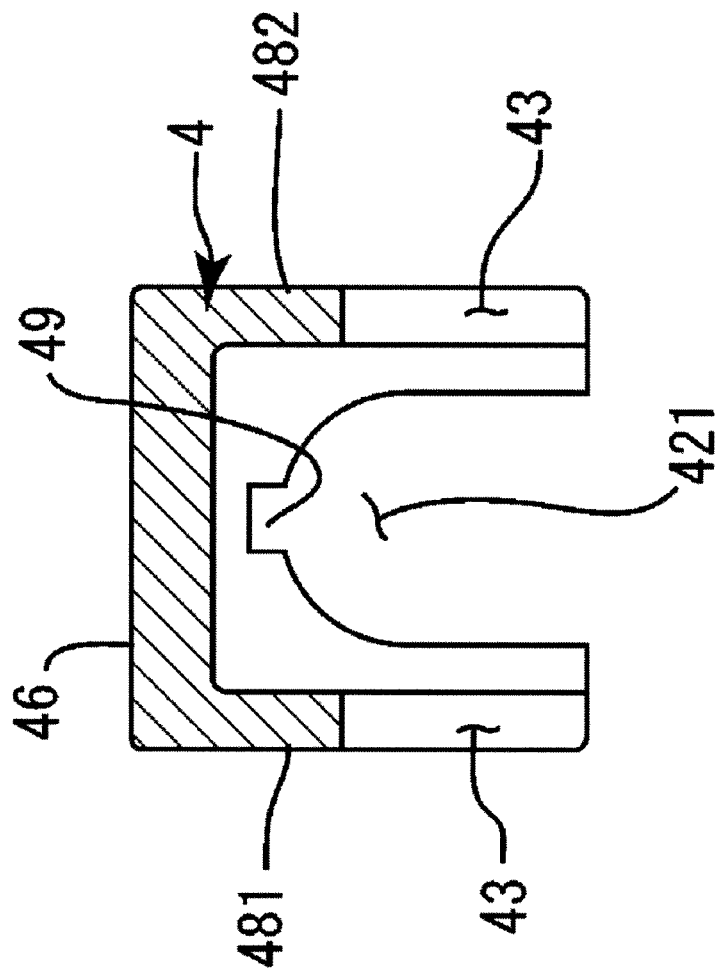
FIG. 11 is a vertical sectional side view of the slide guide in which a notch-like lock portion is formed in one side plate portion.
Figure 12:
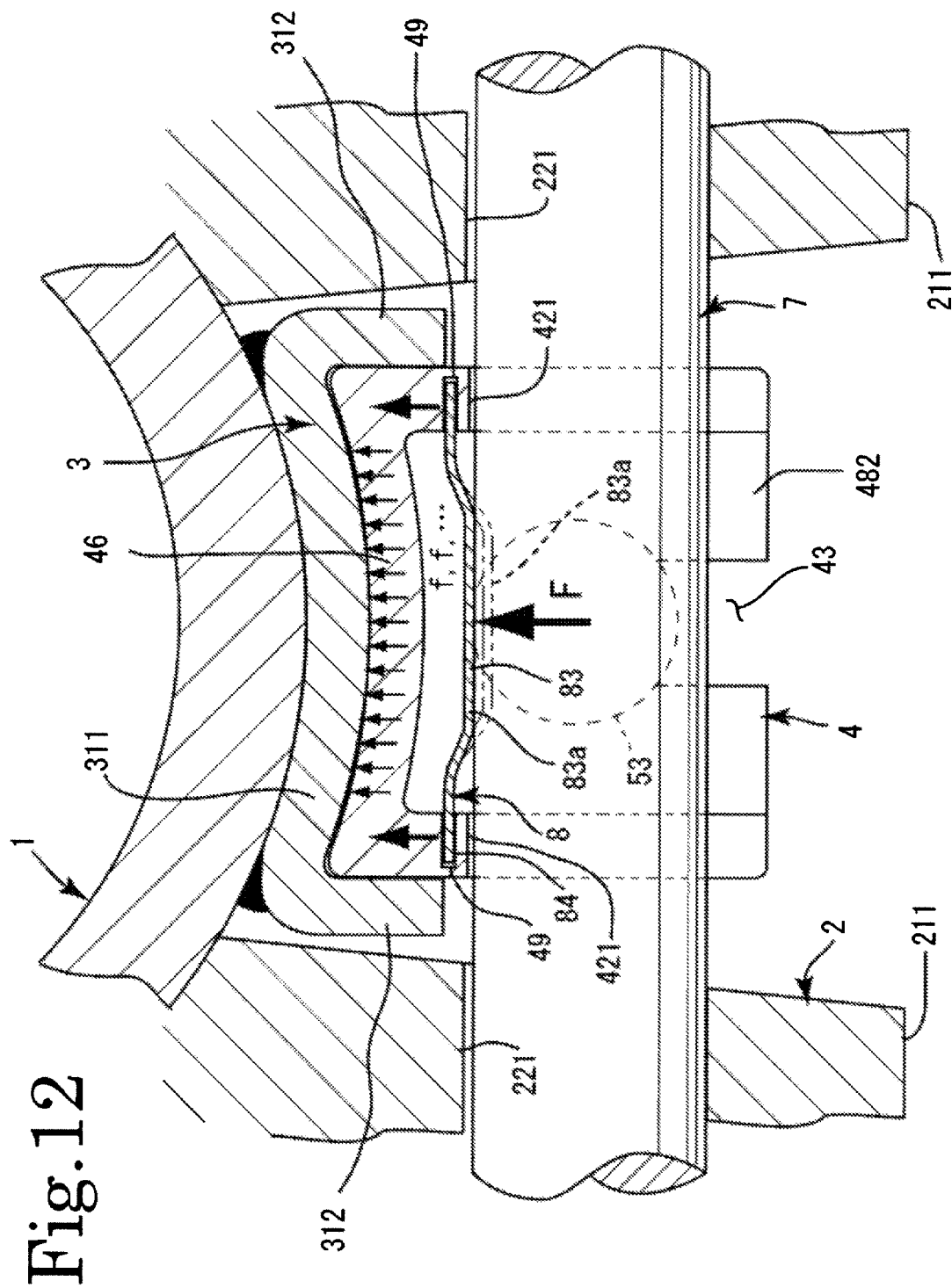
FIG. 12 is an operation diagram relating to the second embodiment.

In a state in which the elastic pushing member 8 is mounted on the slide guide 4, the elastic pushing member 8 assumes a position on the rear surface side of the top base 46 (see FIGS. 10 and 12). The flat receding portion 83a of the elastic plate portion 83 becomes configured to protrude downward. Further, the lower end of the flat receding portion 83a assumes a position lower than the upper end of the shaft support portion 421. Thus, the bolt shaft 71 supported by the shaft support portions 421, 421 abuts on and elastically pushed against the elastic pushing member 8 mounted on the slide guide 4 (see FIG. 12).

More specifically, the bolt shaft 71 abuts on the flat receding portion 83a of the elastic pushing member 8. The elastic pushing member 8 has a substantially rectangular or square shape, but may have any shape provided that the thickness thereof is larger than the distance (clearance) between the outer circumferential surface of the bolt shaft 71 and the lower surface of the top base 46 of the slide guide 4. For example, the elastic pushing member may have a cylindrical shape.

The operation of the second embodiment will be described below. In the second embodiment, the slide guide 4 is mounted on the movable guiding portion 31 of the stopper bracket 3 in the same manner as in the configuration of the first embodiment. The slide guide 4 elastically impels the stopper bracket 3 upward by the elastic pushing member 8 and the bolt shaft 71 of the tightening member 7. During telescopic adjustment, the slide guide 4 is in the immobile state and does not move in the front-rear direction.

Figure 8A:
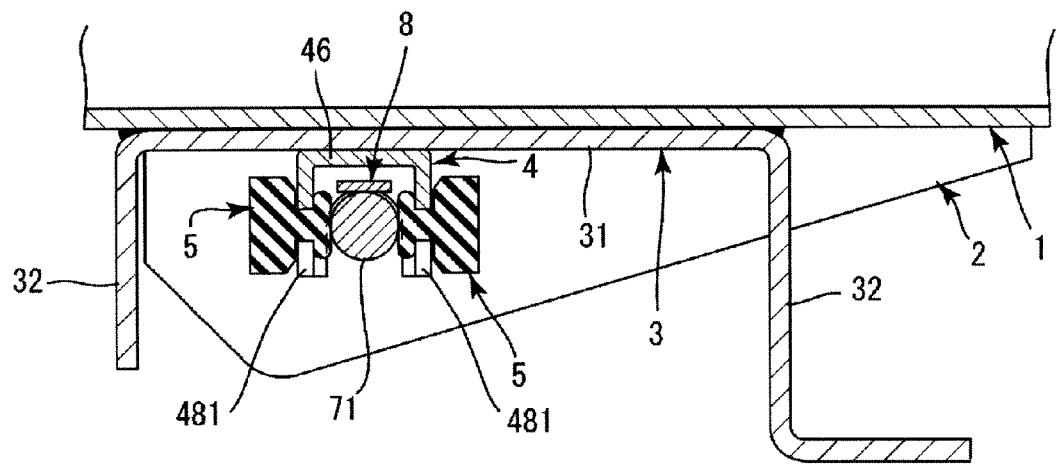
FIG. 8A is an enlarged vertical sectional view of the principal portion in the second embodiment.
Figure 8B:
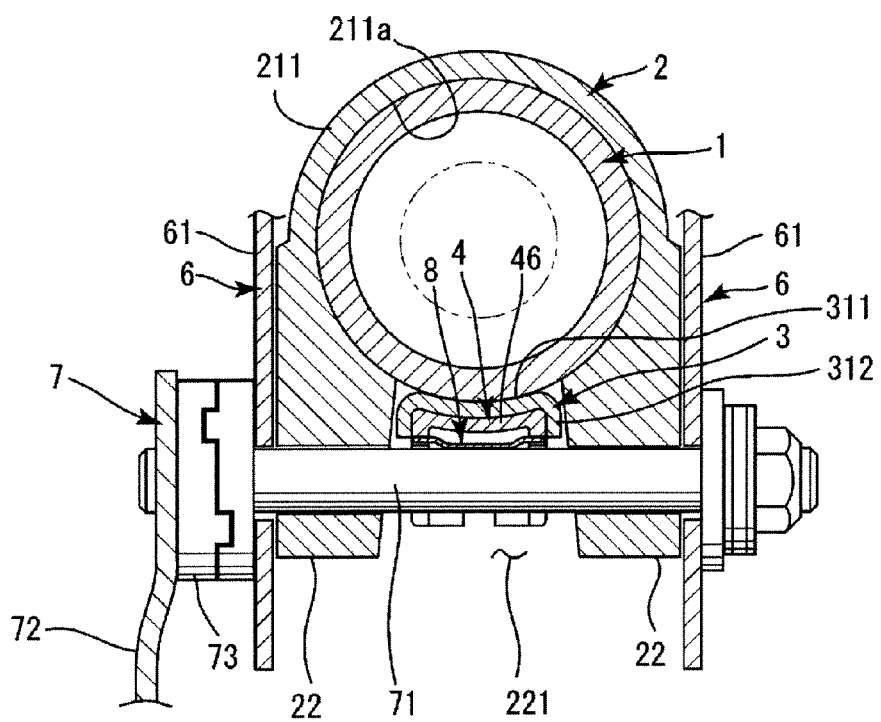
FIG. 8B is an enlarged vertical sectional front view.

The top base 46 of the slide guide 4 is accommodated and abutted (inclusive of a substantially abutted state) between the sagging piece 312 and the protruding rib 311 formed in the movable guiding portion 31 of the stopper bracket 3 (see FIGS. 8A and 8B). As mentioned hereinabove, the shape of the top base 46 is complementary with that of the protruding rib 311 formed in the movable guiding portion 31 of the stopper bracket 3. Where the top base 46 abuts on the movable guiding portion 31 of the stopper bracket 3, the column pipe 1 can move in a stable state in the front-rear direction, without rotating in the circumferential direction. Thus, in the present embodiment, the top base 46 functions as a guide during telescopic adjustment.

Further, where the bolt shaft 71 passing through the two tightening holes 221, 221 of the outer housing 2 is inserted through the two shaft support portions 421, 421 of the slide guide 4, the bolt shaft 71 immobilized in the up-down direction with respect to the outer housing 2 abuts on the elastic pushing member 8, and the flat receding portion 83a of the elastic pushing member 8 is deformed to a certain degree of deflection so as to be pushed upward by a pushing force F. A restoration force acts to return the elastic pushing member 8 to the original shape, but since the flat receding portion 83a abuts on the bolt shaft 71, this restoration force is directed upward and acts to move the slide guide 4 upward via the attachment piece 84 of the elastic pushing member 8.

At this time, the top base 46 of the slide guide 4 elastically impels and pushes the movable guiding portion 31 of the stopper bracket 3 by a distributed load f, f, . . . (see FIG. 12). As a result, the gap between the column pipe 1 and the outer housing 2 is filled and the play of the column pipe 1 can be inhibited. In the second embodiment, the slide guide 4 and the elastic pushing member 8 are prevented from falling down by disposing the bolt shaft 71 below the slide guide 4 and the elastic pushing member 8.

In the second embodiment, the buffer member 5 is also from an elastic rubber and constituted by the elastic head portion 51, neck portion 52, and attachment expanded portion 53. The neck portions 52 of the two buffer members 5 are mounted on, fitted in, and fixed to the respective buffer member mounting portions 43, 43 formed in the front plate portion 481 and rear front portion 482 of the slide guide 4. At the front plate portion 481 and rear front portion 482, the two attachment expanded portions 53, 53 are disposed opposite each other, the shaft portion of the bolt shaft 71 is clamped by or abutted on the two attachment expanded portions 53, 53 (see FIGS. 8A and 9B), and the play of the bolt shaft 71 can be prevented. The buffer member mounting portion 43 is formed such that the lateral distance between the notches thereof is less than the diameter of the neck portion 52 of the buffer member 5. An Ω-like shape may be also used.

Figure 13A:
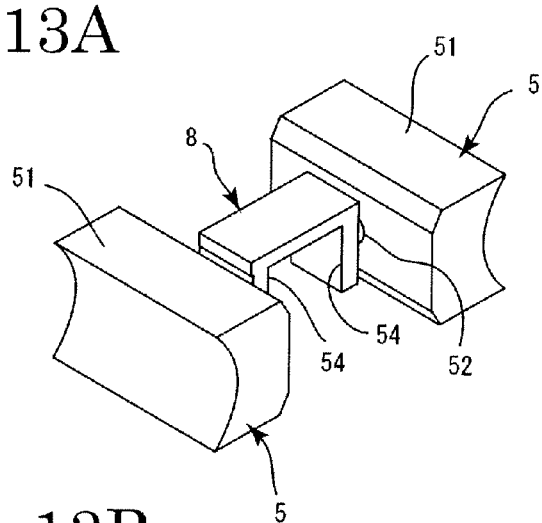
FIG. 13A is a perspective view illustrating an embodiment in which the elastic pushing member and membrane member are formed integrally, FIG. 13 B is an enlarged vertical sectional side view of the principal portion in the case of using the configuration in which the elastic pushing member and membrane member are formed integrally.
Figure 13B:
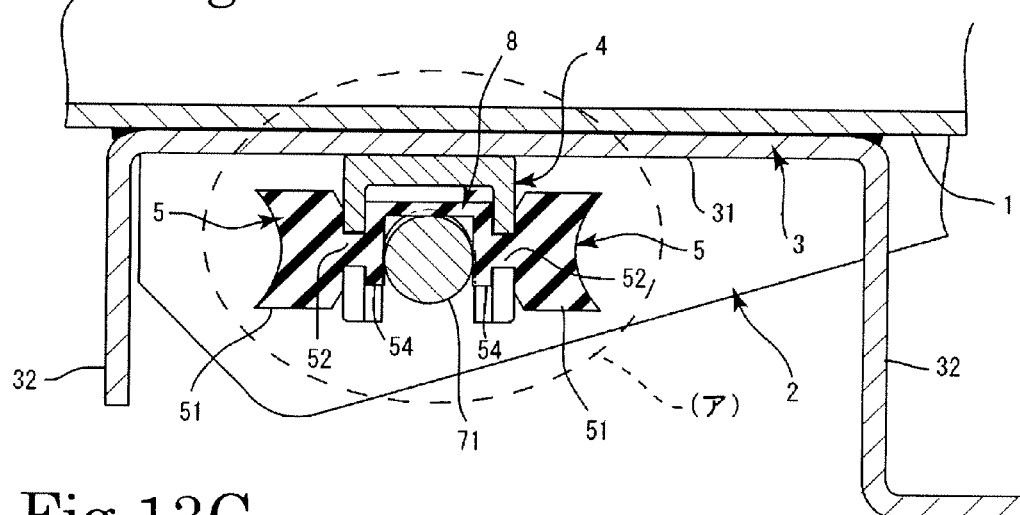
FIG. 13C is an enlarged view of the (a) portion in FIG. 13B.
Figure 13C:
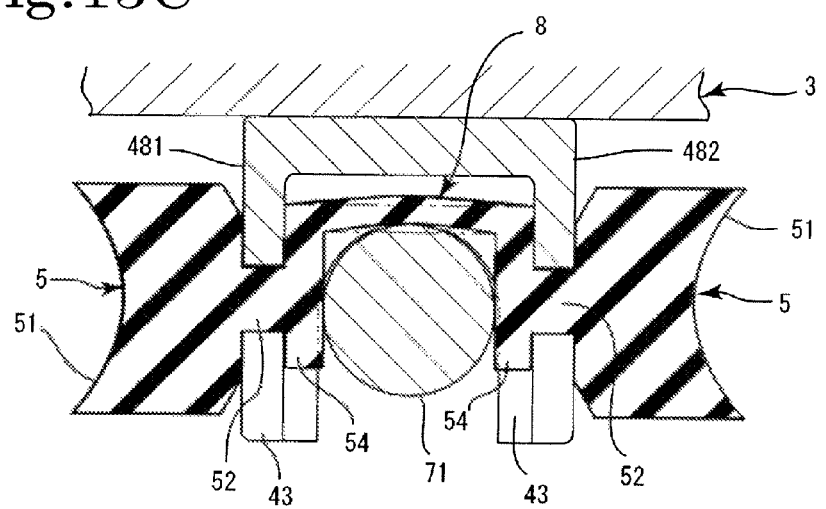

In another possible embodiment, the buffer member and the elastic pushing member 8 are formed integrally (see FIG. 13A). The buffer member 5 is constituted by an elastic head portion 51, a neck portion 52, and a connection piece 54. The connection piece 54 is formed upward from an axial end of the neck portion 52 and serves to connect the neck portion 52 and the elastic pushing member 8. In this case, where the elastic pushing member 8 is made from the same rubber material as the buffer member 5, the two members can be molded completely integrally in a mold.

Where the buffer members 5, 5, integrated with the elastic pushing member 8 are mounted on the buffer member mounting portions 43, 43 formed at the front plate portion 481 and rear plate portion 482 of the slide guide 4, the elastic pushing member 8 can be appropriately mounted on the slide guide 4. In this case, the longitudinal direction of the elastic pushing member 8 becomes perpendicular to the axial direction of the bolt shaft 71 inserted into the two shaft support portions 421, 421 of the slide guide 4 (see FIGS. 13B and 13C).

Where the thickness of the connection pieces 54 is set such that the distance between the two connection pieces 54, 54 of the buffer members 5, 5 integrated with the elastic pushing member 8 is substantially equal to or somewhat less than the diameter of the bolt shaft 71, a configuration is obtained in which the bolt shaft 71 is clamped and the play of the bolt shaft 71 in the axial direction and up-down direction is prevented (see FIG. 13C).

In the first and second embodiments, the buffer member 5 is mounted on the slide guide 4, and the elastic head portion 51 and the attachment expanded portion 53 are connected by the neck portion 52 and formed integrally, but the elastic head portion 51 serving to prevent the occurrence of metallic sound during telescopic adjustment and the attachment expanded portion 53 serving to prevent the play of the bolt shaft 71 may be formed separately from each other. More specifically, the elastic head portions 51 can be mounted on the stopper plates 32, 32 of the stopper bracket 3, and the attachment expanded portion 53 can be mounted between the slide guide 4 and the bolt shaft 71 (this configuration is not shown in the figures).

Further, a configuration may be used in which the attachment expanded portion 53 is omitted and the bolt shaft 71 is directly clamped by the shaft support portion 421 of the slide guide 4. The present invention should not construed as being limited to the aforementioned embodiments, and it goes without saying that the embodiments can be changed and modified as appropriate.

What is claimed is:

1. A steering device comprising:
a column pipe;
an outer housing including a grasping portion that can move and fix the column pipe in a front-rear direction, a clamp portion that diametrically expands and contracts the grasping portion, and a tightening hole;
a fixed bracket including fixing side portions that clamp both lateral sides of the outer housing and a support hole;
a stopper bracket that is fixedly attached to the column pipe and includes stopper plates formed at both ends in the front-rear direction of a movable guiding portion;
a tightening member including a bolt shaft;
a slide guide having shaft support portions that support the bolt shaft;
an elastic buffer member that is mounted on an abutment location of the slide guide and the stopper bracket; and
an elastic pushing member,
wherein the bolt shaft is passed through the tightening hole of the outer housing and the support hole of the fixed bracket along the shaft support portions of the slide guide, and the slide guide abuts on the movable guiding portion of the stopper bracket and is elastically impelled by the elastic pushing member,
wherein the buffer member is mounted on the slide guide and the bolt shaft of the tightening member is clamped by the buffer member.

2. The steering device according to claim 1, wherein the buffer member comprises an elastic head portion, a neck portion, and attachment expanded portions, the neck portion is mounted on a buffer member mounting portion of the slide guide, the attachment expanded portions face each other inside the slide guide, and the bolt shaft of the tightening member is clamped in the front-rear direction by the attachment expanded portions.

3. The steering device according to claim 1, wherein the slide guide comprises a base, a fixed guiding portion including shaft support portions including a notch formed therein, and a guide protrusion guiding the movable guiding portion in an axial direction, torsion coil spring portions are formed at both axial ends of the pushing shaft portion in the elastic pushing member, and the pushing shaft portion abuts on the slide guide.

4. The steering device according to claim 2, wherein the slide guide is configured so that side plate portions including the shaft support portions are formed at both lateral sides of a top base and the elastic pushing member is mounted on a rear surface side of the top base, the top base abuts on the movable guiding portion of the stopper bracket, the bolt shaft is inserted into the shaft support portions, and the elastic pushing member is abutted on the bolt shaft so as to be pushed against the bolt shaft at all times.

5. The steering device according to claim 4, wherein the elastic pushing member includes an elastic plate portion formed in a band-like shape and an attachment piece, locking portions on which the attachment piece is locked are formed above the side plate portions of the slide guide, and the elastic plate portion is mounted between the side plate portions.

6. The steering device according to claim 4, wherein the buffer member and the elastic pushing member are molded integrally as a same member.

7. The steering device according to claim 1, wherein the slide guide comprises a base, a fixed guiding portion including shaft support portions including a notch formed therein, and a guide protrusion guiding the movable guiding portion in an axial direction, torsion coil spring portions are formed at both axial ends of the pushing shaft portion in the elastic pushing member, and the pushing shaft portion abuts on the slide guide.

8. The steering device according to claim 2, wherein the slide guide comprises a base, a fixed guiding portion including shaft support portions including a notch formed therein, and a guide protrusion guiding the movable guiding portion in an axial direction, torsion coil spring portions are formed at both axial ends of the pushing shaft portion in the elastic pushing member, and the pushing shaft portion abuts on the slide guide.

9. The steering device according to claim 1, wherein the slide guide is configured so that side plate portions including the shaft support portions are formed at both lateral sides of a top base and the elastic pushing member is mounted on a rear surface side of the top base, the top base abuts on the movable guiding portion of the stopper bracket, the bolt shaft is inserted into the shaft support portions, and the elastic pushing member is abutted on the bolt shaft so as to be pushed against the bolt shaft at all times.

10. The steering device according to claim 2, wherein the slide guide is configured so that side plate portions including the shaft support portions are formed at both lateral sides of a top base and the elastic pushing member is mounted on a rear surface side of the top base, the top base abuts on the movable guiding portion of the stopper bracket, the bolt shaft is inserted into the shaft support portions, and the elastic pushing member is abutted on the bolt shaft so as to be pushed against the bolt shaft at all times.

\* \* \* \* \*